United States Patent
Iwasaki et al.

(10) Patent No.: US 11,050,112 B2
(45) Date of Patent: Jun. 29, 2021

(54) ELECTRONIC APPARATUS PROVIDED WITH BATTERY CHAMBER AND IMAGE PICKUP APPARATUS INCLUDING ELECTRONIC APPARATUS

(71) Applicant: CANON KABUSHIKI KAISHA, Tokyo (JP)

(72) Inventors: Shogo Iwasaki, Kawasaki (JP); Kyouhei Suzuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/448,274

(22) Filed: Jun. 21, 2019

(65) Prior Publication Data

US 2020/0006725 A1 Jan. 2, 2020

(30) Foreign Application Priority Data

Jun. 27, 2018 (JP) .............................. JP2018-122198

(51) Int. Cl.
*H01M 2/10* (2006.01)
*H04N 5/225* (2006.01)
*H01M 2/30* (2006.01)
*H01M 50/213* (2021.01)
*H01M 50/543* (2021.01)

(52) U.S. Cl.
CPC ....... *H01M 50/213* (2021.01); *H01M 50/543* (2021.01); *H04N 5/2251* (2013.01)

(58) Field of Classification Search
CPC ..... H01M 2/1055; H01M 2/30; H04N 5/2251
USPC ........................................................ 348/372
See application file for complete search history.

(56) References Cited

U.S. PATENT DOCUMENTS

| 4,371,594 A * | 2/1983 | Ohara ................. | H01M 50/213 429/97 |
| 7,058,295 B2 * | 6/2006 | Nishiwaki ............. | G03B 17/02 348/374 |
| 7,623,180 B2 * | 11/2009 | Ariga ................... | H04N 5/2252 348/231.7 |
| 8,395,060 B2 * | 3/2013 | Kajiyama ............ | H05K 5/0239 174/542 |
| 8,582,023 B2 * | 11/2013 | Sato ....................... | G03B 17/02 348/373 |
| 9,260,909 B2 * | 2/2016 | Kaga ...................... | E05C 3/004 |

(Continued)

FOREIGN PATENT DOCUMENTS

JP          2013120198 A       6/2013

*Primary Examiner* — Pritham D Prabhakher
(74) *Attorney, Agent, or Firm* — Rossi, Kimms & McDowell LLP (57) ABSTRACT

An electronic apparatus reduced in a space surrounding a battery chamber and capable of stably supplying electric power. The electronic apparatus is provided with a battery chamber into and from which a battery for supplying electric power is inserted and removed. The battery chamber is defined by an exterior cover forming part of the appearance of the electronic apparatus, and the exterior cover is provided with a battery holding member that defines, when the battery is inserted into the battery chamber, a position of the battery in a direction of insertion thereof. A battery contact member is brought into contact with a terminal provided on the battery to thereby supply electric power from the battery to the electronic apparatus.

4 Claims, 9 Drawing Sheets

(56) References Cited

U.S. PATENT DOCUMENTS

| | | | | |
|---|---|---|---|---|
| 2002/0136553 A1* | 9/2002 | Kaneko | ............... | G03B 17/02 |
| | | | | 396/388 |
| 2003/0152826 A1* | 8/2003 | Matsuzawa | ......... | H01M 50/213 |
| | | | | 429/100 |
| 2004/0212727 A1* | 10/2004 | Ariga | ................ | H04N 5/2252 |
| | | | | 348/375 |
| 2004/0229111 A1* | 11/2004 | Kurosawa | ............... | G03B 7/26 |
| | | | | 429/96 |
| 2005/0002154 A1* | 1/2005 | Nishiwaki | ............ | G03B 17/02 |
| | | | | 361/679.01 |
| 2005/0056829 A1* | 3/2005 | Green | ............... | H01L 31/115 |
| | | | | 257/40 |
| 2005/0134216 A1* | 6/2005 | Tokano | .............. | H01M 50/147 |
| | | | | 320/112 |
| 2006/0134513 A1* | 6/2006 | Tsumura | ............. | H01M 50/10 |
| | | | | 429/100 |
| 2007/0205208 A1* | 9/2007 | Ueda | .................. | G03B 17/02 |
| | | | | 220/813 |
| 2010/0242367 A1* | 9/2010 | Kawai | ................ | H04N 5/2251 |
| | | | | 49/348 |
| 2010/0265388 A1* | 10/2010 | Soumi | ................ | H04N 1/2158 |
| | | | | 348/374 |
| 2016/0242271 A1* | 8/2016 | Akimoto | .............. | G03B 17/55 |

* cited by examiner

ELECTRONIC APPARATUS PROVIDED WITH BATTERY CHAMBER AND IMAGE PICKUP APPARATUS INCLUDING ELECTRONIC APPARATUS

BACKGROUND OF THE INVENTION

Field of the Invention

The present invention relates to an electronic apparatus and an image pickup apparatus including the electronic apparatus, and more particularly to an electronic apparatus provided with a battery chamber for accommodating a battery.

Description of the Related Art

There have been conventionally known electronic apparatuses each provided with a battery chamber for accommodating a battery that supplies electric power for driving the electronic apparatus. The electronic apparatuses of this type include one which has reduced the size of the battery chamber to thereby achieve size reduction of the electronic apparatus itself.

For example, there has been proposed one that has achieved size reduction of the electronic apparatus itself by cutting part of a battery chamber provided in a chassis member of the electronic apparatus and forming the part of the battery chamber by using an exterior cover (see e.g. Japanese Laid-Open Patent Publication (Kokai) No. 2013-120198).

However, in the above-mentioned electronic apparatus described in Japanese Laid-Open Patent Publication (Kokai) No. 2013-120198, the chassis member and the exterior cover overlap each other on part of the battery chamber other than the cut part, and hence the battery chamber is increased in thickness, which makes it difficult to reduce the size of the whole battery chamber.

Further, for example, let it assume a case where a component which is brought into contact with and is electrically connected to a contact portion of the battery is used as a chassis member, and a component which regulates the position of the battery in a direction of inserting the battery is attached to the exterior cover. In this case, there is a fear that it is impossible to stably supply electric power when an external force, such as an impact, is applied to the battery chamber.

SUMMARY OF THE INVENTION

The present invention provides an electronic apparatus that is reduced in a space surrounding a battery chamber and is capable of stably supplying electric power and an image pickup apparatus including the electronic apparatus.

In a first aspect of the present invention, there is provided an electronic apparatus comprising a battery chamber into and from which a battery for supplying electric power is inserted and removed, the battery chamber being defined by an exterior cover forming part of the appearance of the electronic apparatus, and the exterior cover being provided with a battery holding member that defines, when the battery is inserted into the battery chamber, a position of the battery in a direction of insertion thereof, and a battery contact member that is brought into contact with a terminal provided on the battery to thereby supply electric power from the battery to the electronic apparatus.

In a second aspect of the present invention, there is provided an image pickup apparatus including an electronic apparatus, and an image pickup device, wherein the electronic apparatus comprises a battery chamber into and from which a battery for supplying electric power is inserted and removed, the battery chamber being defined by an exterior cover forming part of the appearance of the electronic apparatus, and the exterior cover being provided with a battery holding member that defines, when the battery is inserted into the battery chamber, a position of the battery in a direction of insertion thereof, and a battery contact member that is brought into contact with a terminal provided on the battery to thereby supply electric power from the battery to the electronic apparatus.

According to the present invention, it is possible to reduce the space surrounding the battery chamber and stably supply electric power.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1A:
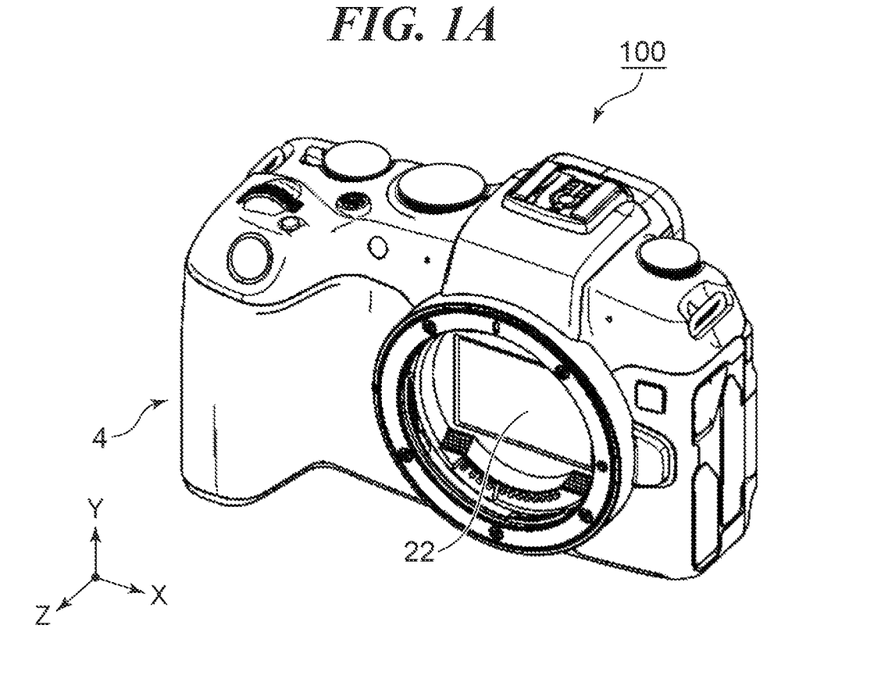
FIGS. 1A and 1B are perspective views showing the appearance of a digital camera as an image pickup apparatus including an electronic apparatus according to an embodiment of the present invention in a state in which an upper surface (top surface) of the digital camera is directed upward, as viewed from the front and the rear, respectively.
Figure 1B:
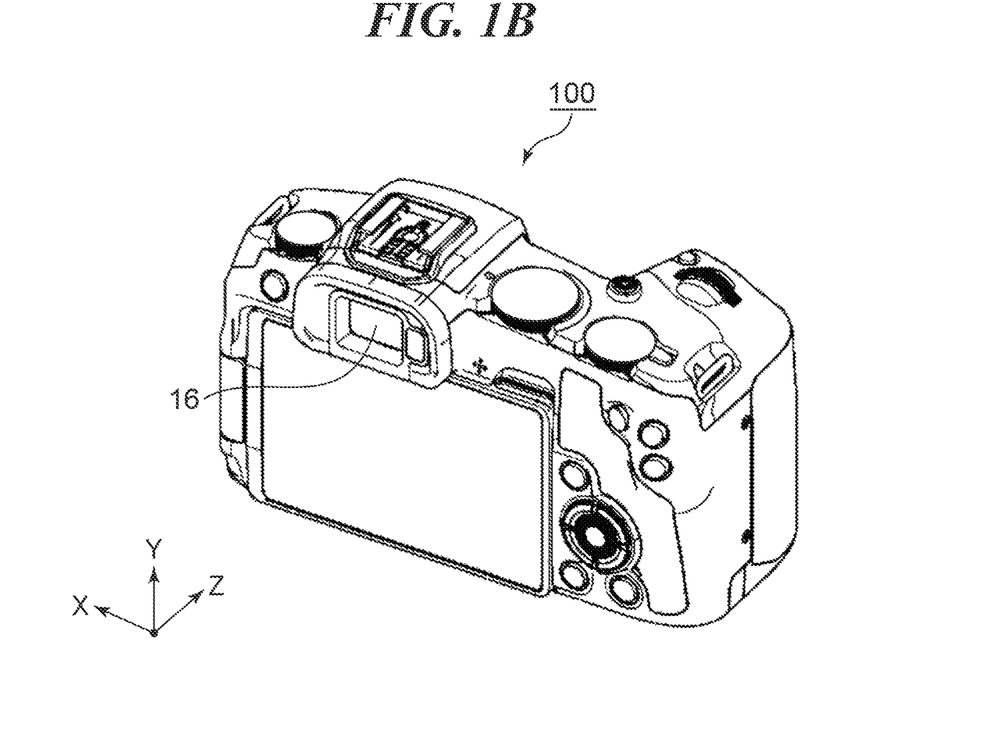

FIGS. 1A and 1B are perspective views showing the appearance of an image pickup apparatus as an example of an electronic apparatus according to an embodiment of the present invention in a state in which an upper surface (top surface) thereof is directed upward. FIG. 1A is a perspective view of the image pickup apparatus, as viewed from the front, and FIG. 1B is a perspective view of the same, as viewed from the rear.

The illustrated image pickup apparatus is e.g. a digital camera (hereinafter simply referred to as the camera) 100, and is shown in FIGS. 1A and 1B in a state in which a lens unit (not shown) is removed therefrom. Here, a lateral direction of the camera 100 is defined as an X direction and a direction of height is defined as a Y direction. Further, a direction of an optical axis of light entering an image pickup device 22, described hereinafter, (i.e. an optical axis direction of the lens unit), is defined as a Z direction.

The camera 100 is provided with the image pickup device 22, and the image pickup device 22 outputs electric signals (analog signals) corresponding to an optical image formed through the lens unit. Note that the image pickup device 22 includes e.g. a CCD or CMOS image sensor.

The camera 100 has an eyepiece finder 16 arranged on a rear side thereof. The eyepiece finder 16 enables a user to check a focusing state of an object and a composition of a photograph by viewing a display section within the finder.

The camera 100 is provided with a grip part 4, and the user holds the camera 100 by grasping the grip part 4 with his/her right hand when performing photographing. This grip part 4 is molded into a shape which can be easily grasped by the user with his/her right hand when the user holds the camera 100.

Note that the grip part 4 is formed by a grip member 120 which defines a battery chamber 110, described hereinafter. That is, the grip member 120 (see FIG. 5A) is a member which defines the appearance of the grip part 4, and covers an outer front portion of the battery chamber 110.

Figure 2A:
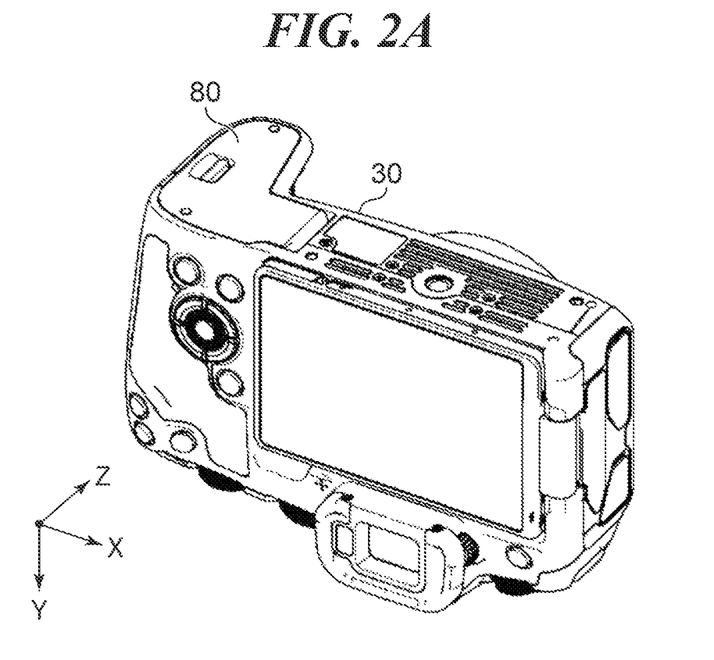
FIGS. 2A and 2B are perspective views each showing the digital camera shown in FIGS. 1A and 1B in a state in which a bottom surface thereof is directed upward, as viewed from the rear.
Figure 2B:
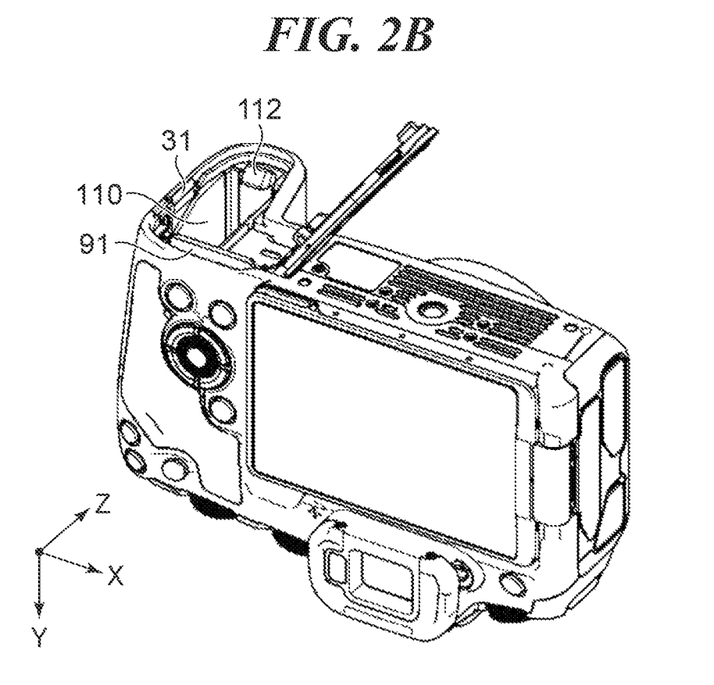

FIGS. 2A and 2B are perspective views each showing the camera 100 shown in FIGS. 1A and 1B in a state in which a bottom surface thereof is directed upward, as viewed from the rear. In FIG. 2A, a lid of the battery chamber 110 (battery lid) 80 is closed, whereas in FIG. 2B, the battery lid 80 is opened.

Figure 3A:
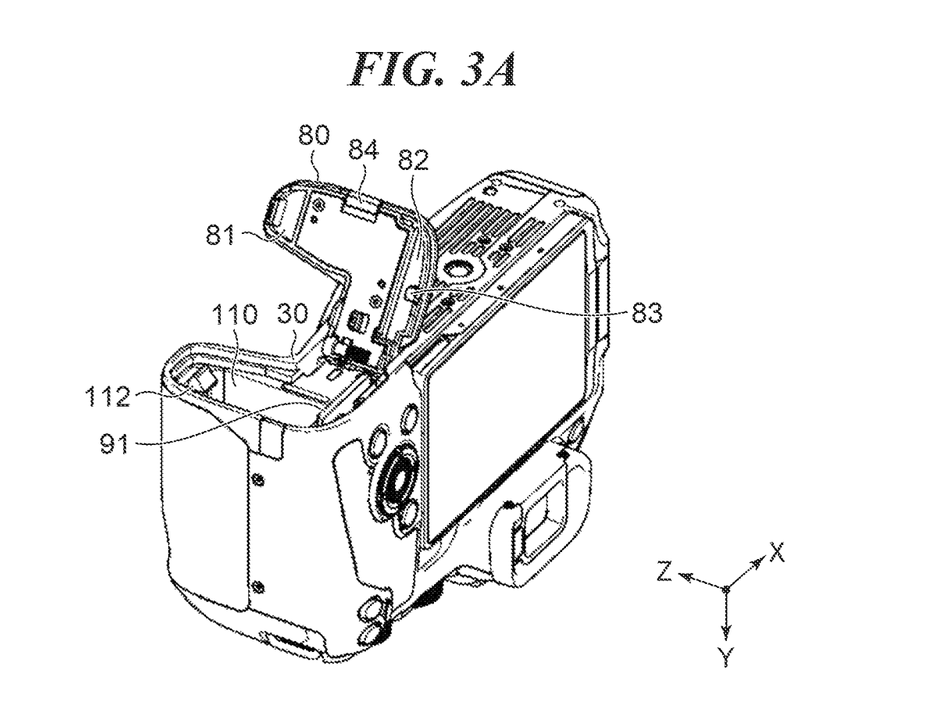
FIGS. 3A and 3B are perspective views each showing the digital camera shown in FIGS. 1A and 1B in a state in which the bottom surface thereof is directed upward, as viewed from a lateral side.
Figure 3B:
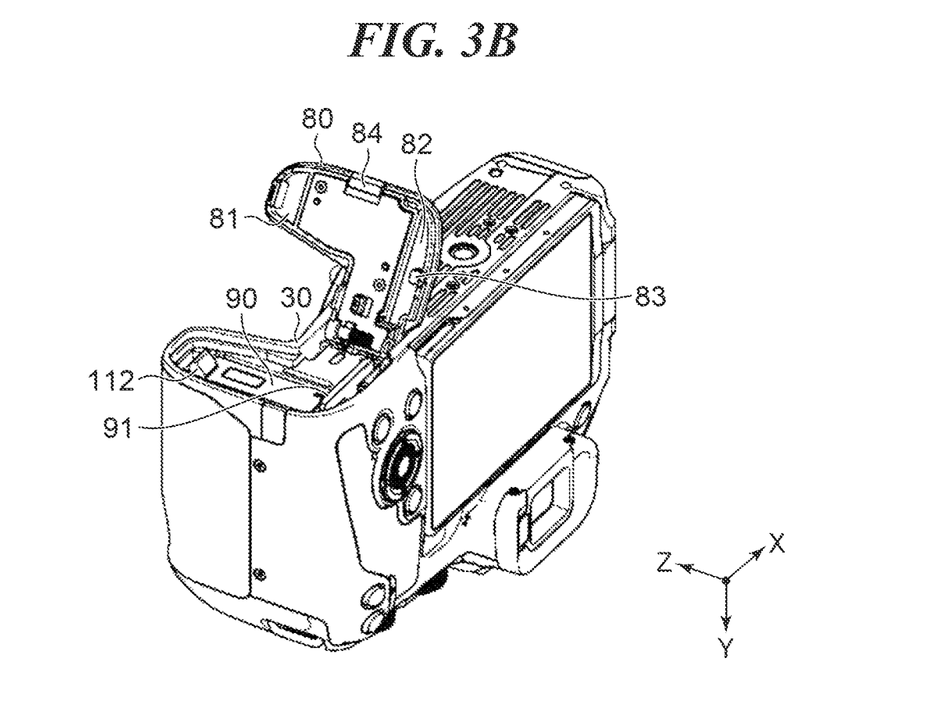

Further, FIGS. 3A and 3B are perspective views each showing the camera 100 shown in FIGS. 1A and 1B in a state in which the bottom surface thereof is directed upward, as viewed from a lateral side. In FIG. 3A, the battery lid 80 is opened and is in a state before inserting a battery 90 in the battery chamber 110, whereas in FIG. 3B, the battery lid 80 is opened and is in a state after the battery 90 is inserted in the battery chamber 110.

Referring to FIGS. 2A, 2B, 3A, and 3B, the illustrated battery 90 is a battery pack having a substantially rectangular parallelepiped shape and has a contact portion (not shown) provided on a front end surface thereof in a direction of inserting the battery 90 into the battery chamber 110. When the battery 90 is inserted into the battery chamber 110, the contact portion is brought into contact with a battery contact member 114 (see FIG. 4B), described hereinafter, whereby electric power is supplied from the battery 90 to the camera 100.

A space for accommodating a recording medium 91 is defined in the battery chamber 110, and data of an image obtained through photographing, is recorded in the recording medium 91. As the recording medium 91, a memory card, for example, is used.

When inserting or removing the battery 90 or the recording medium 91 into or from the battery chamber 110, the battery lid (lid member) 80 is opened and closed. As shown in FIGS. 2A and 2B, the battery lid 80 is mounted on the camera 100 such that the battery lid 80 is rotatable between an open position and a closed position. Note that the illustrated battery chamber 110 is provided within the grip part 4 and the battery 90 is accommodated and held in the battery chamber 110.

Figure 4A:
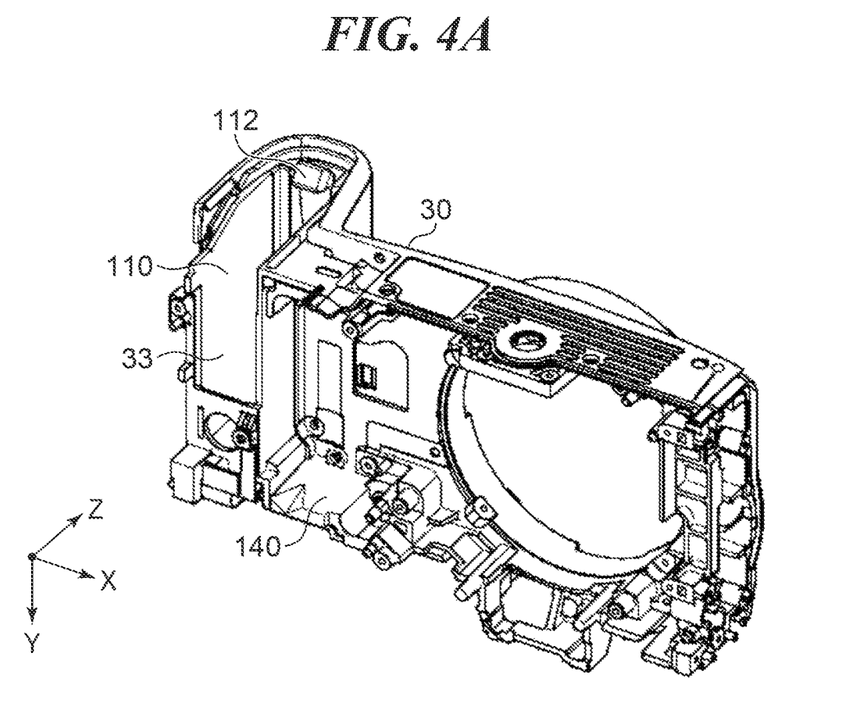
FIGS. 4A and 4B are views useful in explaining an example of a front cover as one of exterior covers forming the digital camera shown in FIGS. 1A and 1B.
Figure 4B:
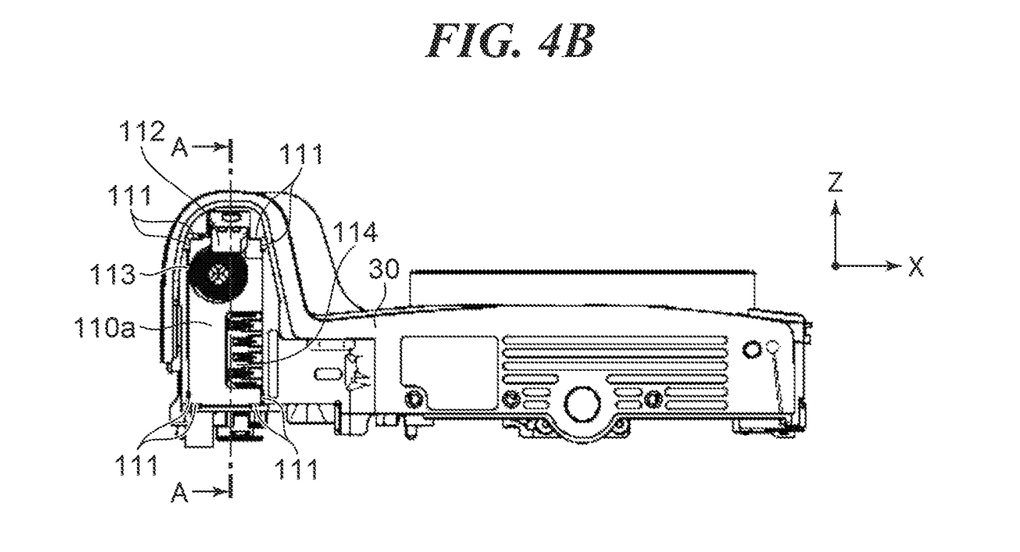

FIGS. 4A and 4B are views useful in explaining an example of a front cover 30 as one of exterior covers as a component of the camera 100 shown in FIGS. 1A and 1B. FIG. 4A is a perspective view of the front cover 30 and FIG. 4B is a bottom view of the same.

As shown in FIG. 4A, the front cover 30 has the battery chamber 110 formed therein. Further, wall surfaces defining the battery chamber 110 have two pairs of rails (rail portions) 111 disposed at respective four places (i.e. at opposite ends of side wall surfaces of the battery chamber 110). When the battery 90 is received into the battery chamber 110, the position of the battery 90 in the X direction and the Z direction is regulated by the rails 111. Note that as described hereinafter, the grip member 120 (see FIG. 6A) is arranged on an outer surface of part of the front cover 30 where the battery chamber 110 is formed.

Figure 5A:
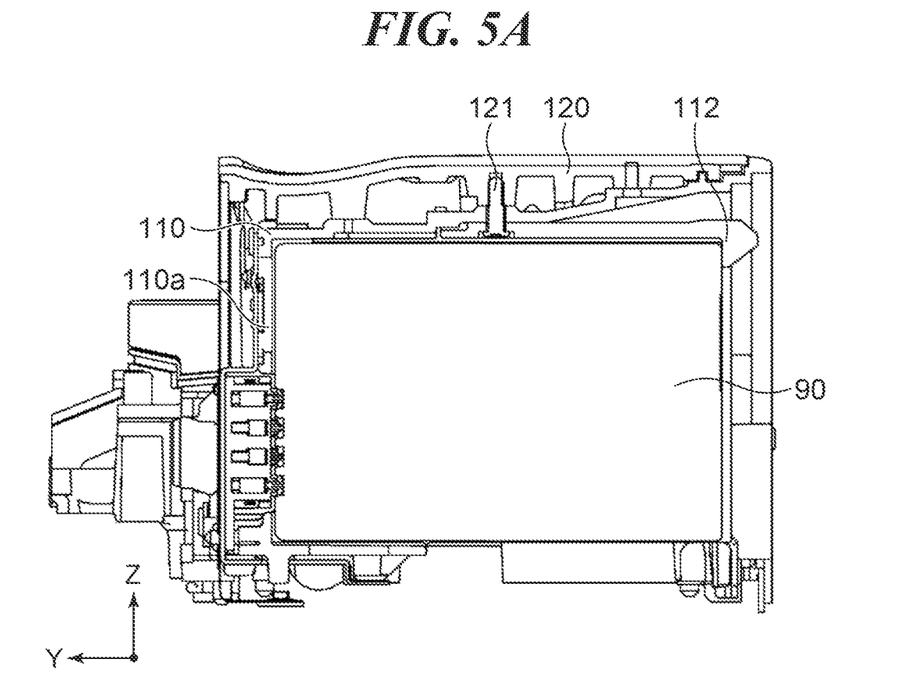
FIGS. 5A and 5B are views useful in further explaining the front cover shown in FIGS. 4A and 4B.
Figure 5B:
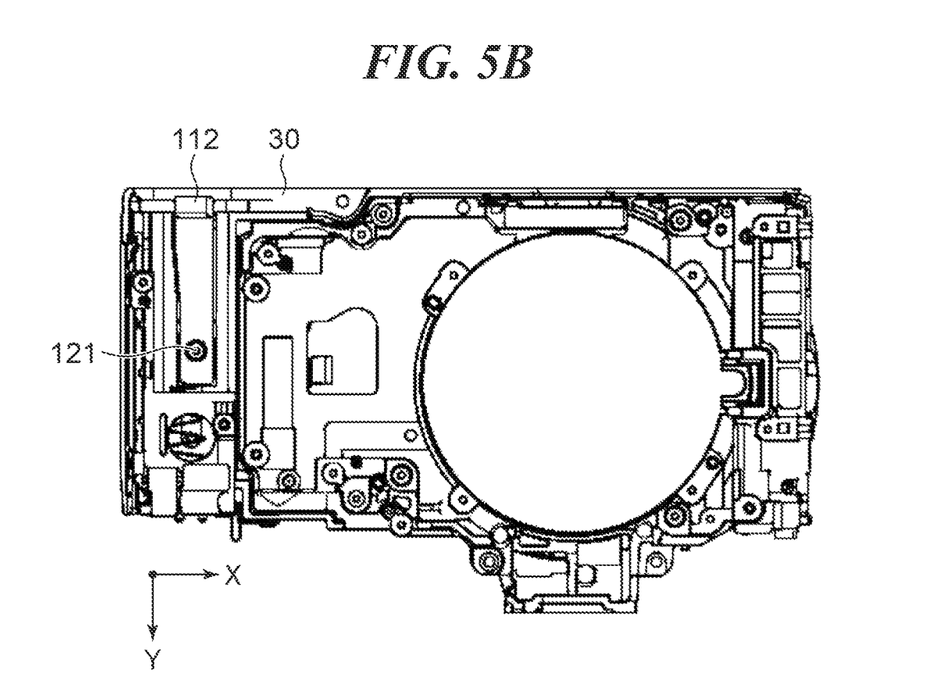

FIGS. 5A and 5B are views useful in further explaining the front cover 30 shown in FIGS. 4A and 4B. FIG. 5A is a cross-sectional view of the front cover 30 taken along A-A in FIG. 4B, and FIG. 5B is a rear view of the front cover 30.

FIGS. 5A and 5B each show a state of the front cover 30 in which the battery 90 is accommodated in the battery chamber 110. The grip member 120 is fastened to a wall defining the battery chamber 110 from the rear side of the camera 100 in the Z direction in FIGS. 5A and 5B, with a grip member-fastening screw 121. Note that the battery chamber 110 is open on a line extending in a direction of fastening the grip member-fastening screw 121.

To regulate the position of the battery 90 in the same direction as that of fastening the grip member-fastening screw 121, the rails 111 are disposed on the wall surfaces of the battery chamber 110 as mentioned above. Further, the grip member-fastening screw 121 is fastened substantially at the center in width of the battery chamber 110 in the X direction. With this, the screw fastening portion and the rails 111 are caused to co-exist in a narrow space defined by the width of the battery chamber 110 in the X direction.

In the battery chamber 110, a battery lock lever (battery holding member) 112 is jointly fastened and fixed to the wall surface (inner wall), located on an object side, of the battery chamber 110 with the grip member-fastening screw 121. In a state of the battery chamber 110 in which the battery 90 is inserted, as shown in FIG. 5A, the battery lock lever 112 is engaged with the battery 90. With this, the position of the battery 90 in the Y direction is regulated against a spring force of a battery discharge spring 113, referred to hereinafter.

Note that the battery discharge spring 113 and the battery contact member 114 are disposed on an abutment surface 110a of the battery chamber 110, which is located in the direction of inserting the battery 90.

Figure 6A:
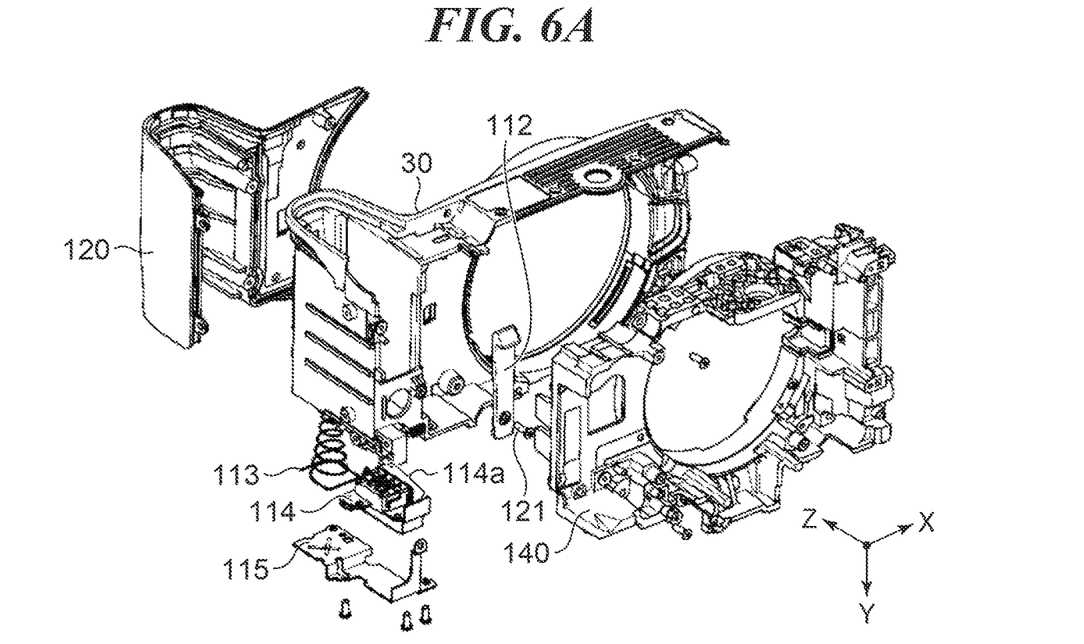
FIGS. 6A and 6B are exploded perspective views of the front cover shown in FIGS. 4A and 4B.
Figure 6B:
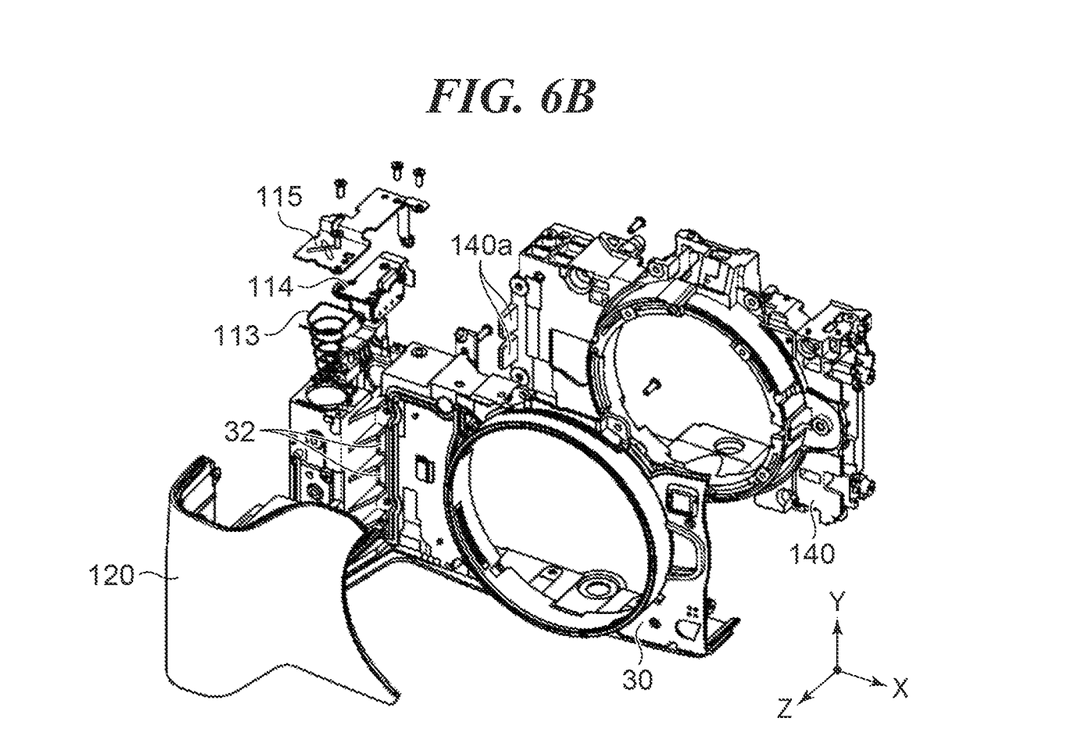

FIGS. 6A and 6B are exploded perspective views of the front cover shown in FIGS. 4A and 4B. FIG. 6A is an exploded perspective view of the front cover, as viewed from the rear, and FIG. 6B is an exploded perspective view of the same, as viewed from the front.

The battery discharge spring 113 is held by being sandwiched between the front cover 30 and a holding metal plate 115, and the battery contact member 114 is directly attached to the front cover 30 with screws using the holding metal plate 115. The battery contact member 114 is provided with a contact spring 114a which can be elastically deformed (has flexibility) in the Y direction. When the battery 90 is inserted into the battery chamber 110, the contact spring 114a is brought into contact with a terminal portion (not shown) of the battery 90, whereby electric power for driving the camera 100 is supplied from the battery 90.

In the illustrated example, the front cover 30 and the battery chamber 110 are integrally formed, and the battery chamber 110 is not surrounded by any other exterior cover, and hence it is possible to not only reduce the size of the battery chamber 110, but also reduce the number of components.

Further, in the illustrated example, the battery lock lever 112 and the battery contact member 114 are directly attached to the front cover 30, and hence the contact between the contact portion of the battery 90 and the contact spring 114a is hardly influenced by variation in the dimensions and assembly of the components. Further, in case an impact, such as a drop impact, is received, although the battery 90 is moved in the Y direction, the contact spring 114a is also deformed in the same direction while maintaining contact with the contact portion of the battery 90, which prevents the contact portion of the battery 90 and the contact spring 114a from being separated, and hence instantaneous interruption of power hardly occurs. As a result, it is possible to stably supply electric power when the camera 100 is in use.

An end of the battery lock lever 112 opposite to an end thereof fastened by the grip member-fastening screw 121 can be elastically deformed in the Z direction. As a result, when the battery 90 is inserted or removed, the battery lock lever 112 can be elastically deformed, whereby it is possible to smoothly insert or remove the battery 90. FIG. 5A shows a state of the battery lock lever 112 in which it locks the battery 90 inserted into the battery chamber 110. When the battery lock lever 112 is operated by the user in the Z direction, the battery discharge spring 113 discharges the battery 90 in a −Y direction.

Figure 7A:
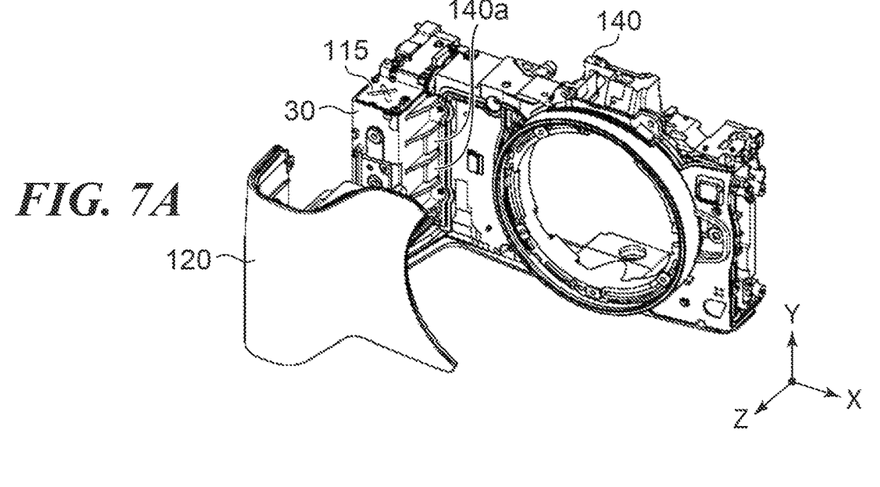
FIGS. 7A and 7B are views useful in explaining a relationship between a chassis member, the front cover, and a grip part of the digital camera shown in FIGS. 1A and 1B.
Figure 7B:
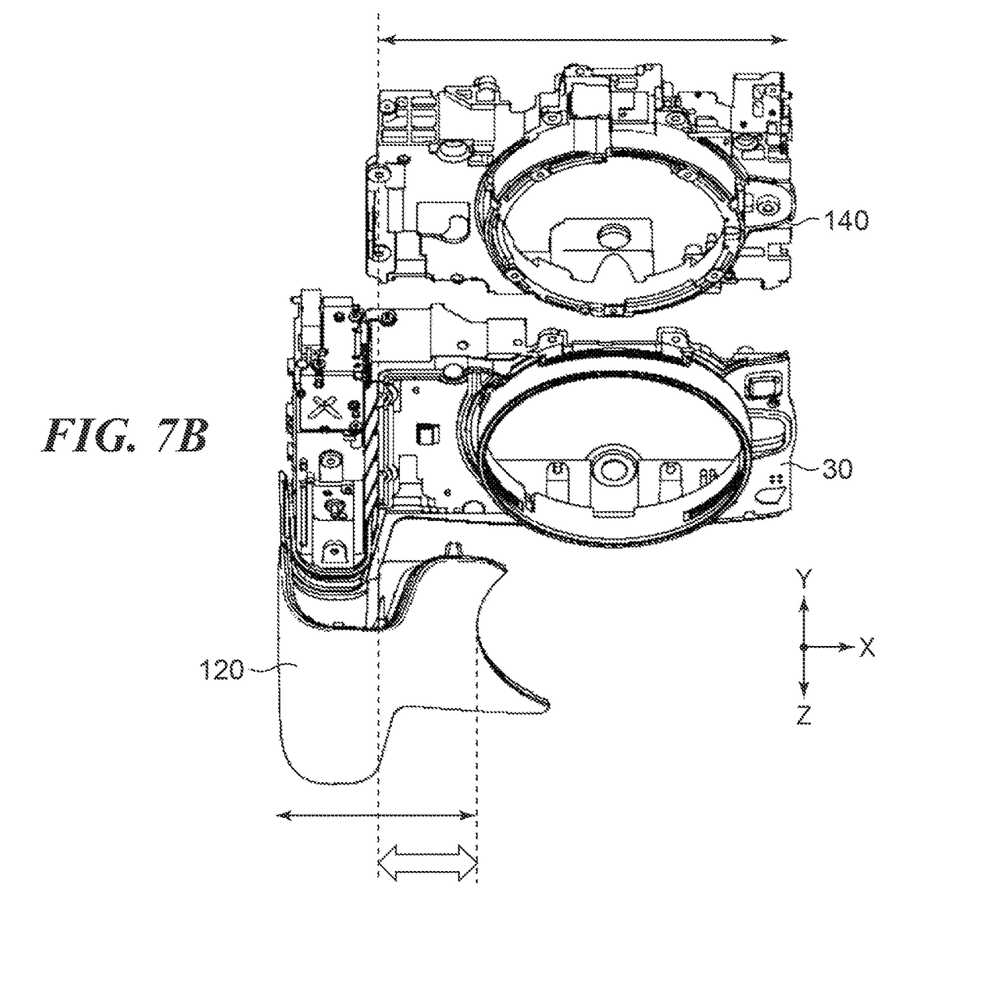

FIGS. 7A and 7B are views useful in explaining a relationship between a chassis member 140, the front cover 30, and the grip member 120 of the camera 100 shown in FIGS. 1A and 1B. FIG. 7A is a perspective view of the chassis member 140, the front cover 30, and the grip member 120, in a state in which the grip member 120 is removed, as viewed from the front, and FIG. 7B is an exploded perspective view of the same members, as viewed from the above.

The chassis member 140 is molded of metal (conductive member), such as magnesium, and is fastened to the front cover 30. Further, the chassis member 140 is electrically connected to a minus terminal of the battery 90 via a main circuit board 130, described hereinafter, and provides a reference potential.

In the illustrated example, the front cover 30 is molded of an electrically non-conductive material, such as electrically non-conductive resin. Further, the grip member (battery chamber cover member: holding portion) 120 is a two-color molded component which is molded of a conductive resin having conductivity (conductive resin portion: conductive material) as a primary material and an elastomer resin having elasticity (elastic material) as a secondary material, and the chassis member 140 and the conductive resin portion of the grip member 120 are electrically connected to each other by fastening screws. The grip member 120 has the primary material disposed at a location toward the battery chamber 110 and the secondary material disposed at a location outside the primary material.

By forming the outer appearance of the grip member 120 using the elastomer resin, grip feeling when gripping the camera 100 is improved. In a positional relationship between the chassis member 140 and the grip member 120, part where the chassis member 140 and the grip member 120 overlap each other in imaginary projections thereof from a front side of the camera 100 extends in the X direction, as indicated by a hollow arrow in FIG. 7B. This overlapping part makes it possible to cover a wide range of the front surface (front side) of the camera 100 with the electrically conductive material without any gap.

In the illustrated example, the front cover 30 is molded of resin which is an electrically non-conductive material, and this makes it possible to properly block electromagnetic waves generated e.g. from the recording medium 91.

As shown in FIGS. 6B and 7A, the chassis member 140 is formed with heat dissipation portions (heat dissipation shape portions) 140a each having a protruding shape which is a heat dissipating shape. On the other hand, the front cover 30 is formed with holes 32 at respective locations corresponding to the heat dissipation portions 140a each having a protruding-shape. When the front cover 30 and the chassis member 140 are assembled, the heat dissipation portions 140a each having a protruding-shape protrude from the holes 32, respectively, whereby the heat dissipation portions 140a are disposed between the grip member 120 and the battery chamber 110.

When the camera 100 is in use, heat generated from the display section within the finder, the main circuit board 130, and so forth, is transferred to the chassis member 140, which increases the temperature of the chassis member 140. At this time, the heat of the chassis member 140 is transferred to the grip member 120 via an air layer from the heat dissipation portions 140a each having a protruding shape, and is efficiently dissipated to the outside of the camera 100.

Figure 8A:
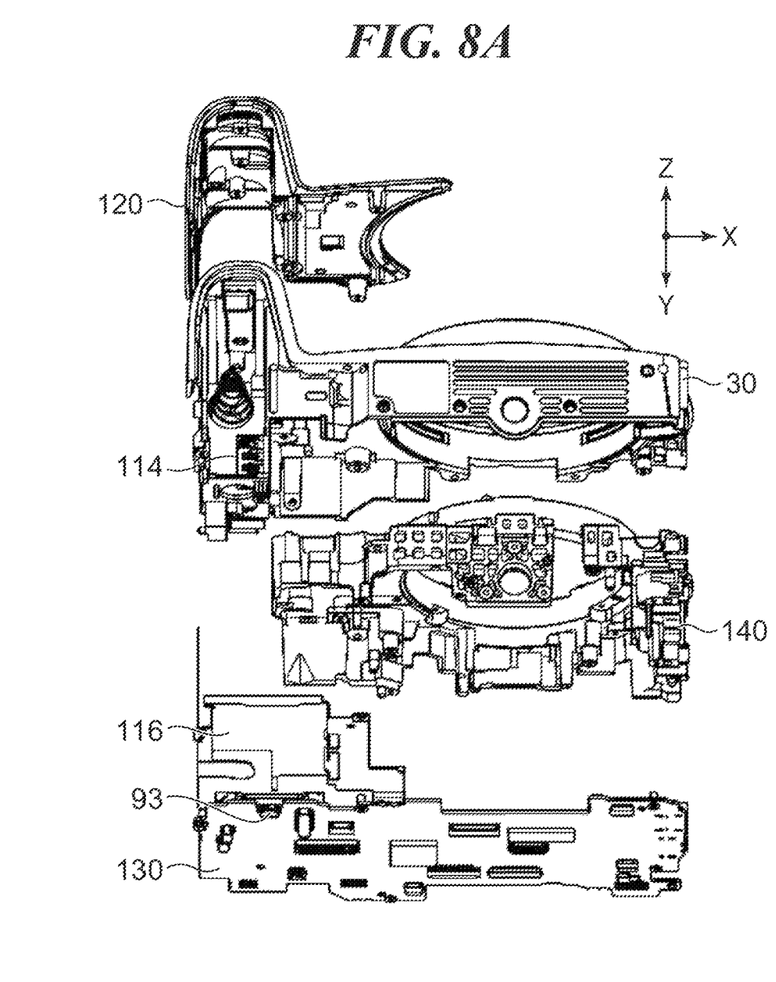
FIGS. 8A and 8B are exploded perspective views of the chassis member and the front cover of the digital camera shown in FIGS. 1A and 1B.
Figure 8B:
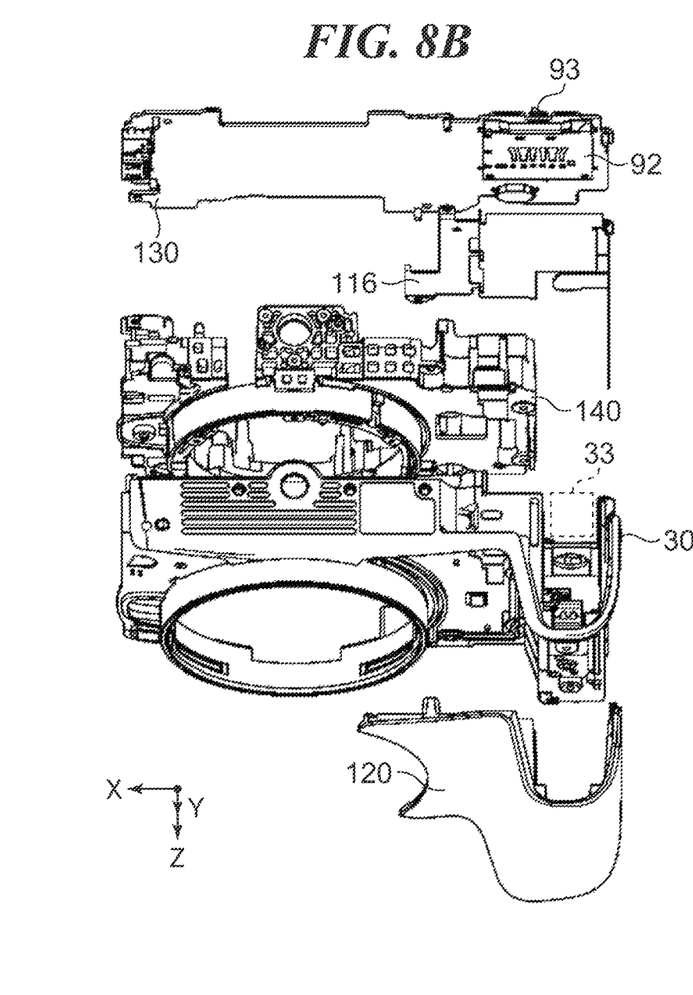

FIGS. 8A and 8B are exploded perspective views of the chassis member 140 and the front cover 30 of the camera 100 shown in FIGS. 1A and 1B. FIG. 8A is a view of the chassis member 140 and the front cover 30, as viewed from the above in a rearward direction, and FIG. 8B is a view of the same, as viewed from the above in a forward direction.

Figure 9A:
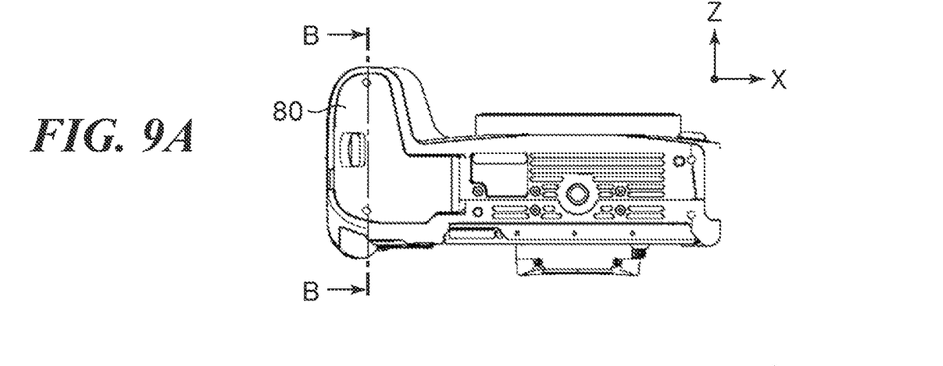
FIGS. 9A to 9C are views of the chassis member and the front cover, used for the digital camera shown in FIGS. 1A and 1B.
Figure 9B:
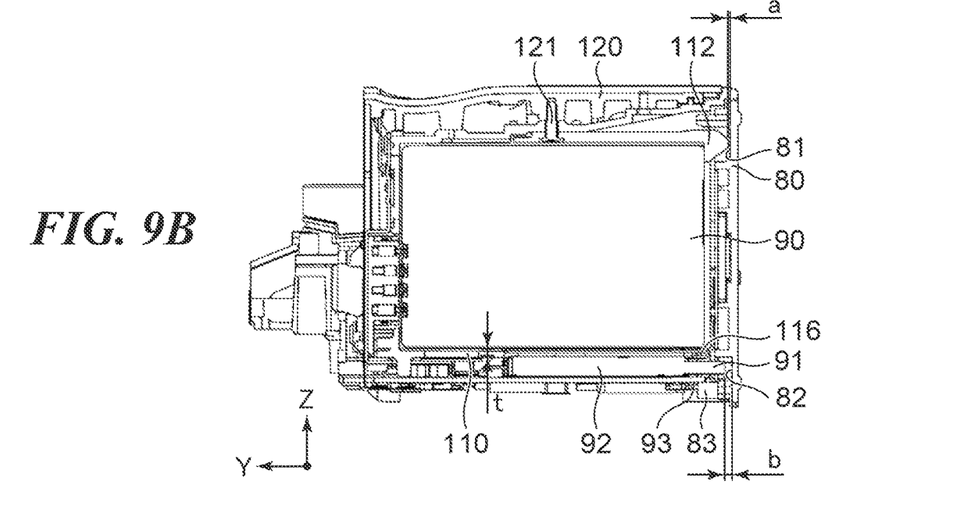
Figure 9C:
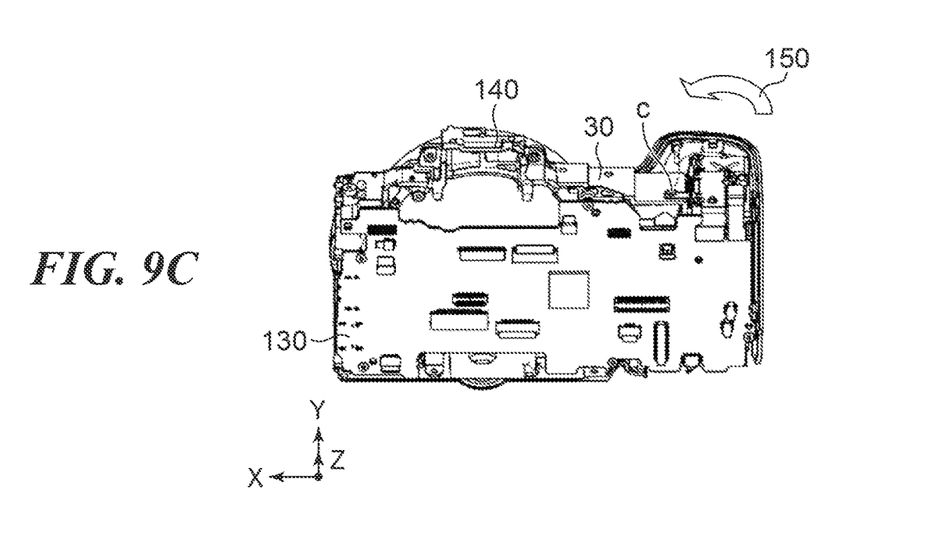

Further, FIGS. 9A to 9C are views of the chassis member 140 and the front cover 30, used for the camera shown in FIGS. 1A and 1B. FIG. 9A is a bottom view of the chassis member 140 and the front cover 30, FIG. 9B is a cross-sectional view of the same taken along B-B in FIG. 9A, and FIG. 9C is a rear view of the same.

Referring to FIGS. 8A to 9C, the camera 100 includes the main circuit board 130 and a sheet metal member 116, as illustrated therein. The main circuit board 130 is formed with a recording medium slot 92 into which the recording medium 91 is inserted, and further has a plurality of electrical components mounted thereon, including a battery lid detection switch 93 for detecting closure of the battery lid 80. Further, the main circuit board 130 has a plurality of connectors mounted thereon, which receive a plurality of connection circuit boards for transmitting signals received from the components of the camera 100.

The battery contact member 114 is connected to the main circuit board 130 via a flexible printed circuit board, not shown. Further, the main circuit board 130 has one end thereof fixed to the front cover 30 and the other end thereof fixed to the chassis member 140.

As shown in FIGS. 3A and 3B, a battery lid lock lug 84 attached to the battery lid 80 can be advanced and retracted by a spring (not shown). Further, in a case where the battery lid 80 is in the closed state, the battery lid lock lug 84 is engaged with a battery lid-retaining portion 31 (see FIG. 2B) of the front cover 30, whereby the position of the battery lid 80 in the Y direction is determined.

Further, the battery lid 80 is provided with a battery lock lever-holding surface 81, a recording medium-holding surface 82, and a battery lid detection switch contact portion 83. As shown in FIG. 9B, when the battery lid 80 is in the closed state, the battery lock lever-holding surface 81 is positioned with a predetermined clearance "a" in the Y direction with respect to the battery lock lever 112. Similarly, when the battery lid 80 is in the closed state, the recording medium-holding surface 82 is positioned with a predetermined clearance "b" in the Y direction with respect to the recording medium 91 inserted in the recording medium slot 92.

When the battery lid 80 is closed, the battery lid detection switch contact portion 83 pushes in the battery lid detection switch 93, whereby closure of the battery lid 80 is detected.

As mentioned hereinabove, the Y direction of the battery lid 80 is defined by the battery lid-retaining portion 31 of the front cover 30, and the main circuit board 130 provided with the battery lock lever 112 and the recording medium slot 92 is directly attached to the front cover 30.

As a result, the clearances "a" and "b" are hardly influenced by variation in the dimensions and assembly of the components, and the design values of them can be further reduced. Therefore, if an impact is applied to the camera 100 when the camera 100 is in use, the battery 90 is moved in the −Y direction in accordance with deformation of the battery lock lever 112 in the −Y direction. This makes it possible to avoid instantaneous interruption of power, caused by separation of the contact portion of the battery 90 and the contact spring 114a.

Further, when an impact that might cause the recording medium 91 to be discharged from the recording medium slot 92 is received, the recording medium 91 is supported by the recording medium-holding surface 82, and hence the recording medium 91 is held within the recording medium slot 92, and it is possible to prevent occurrence of a phenomenon, such as disabled communication with the recording medium 91.

Note that if the battery lock lever 112 is disposed outside the battery chamber 110, there is a fear that the shape of the battery lock lever 112 becomes complicated and is liable to be deformed in the Y direction. For this reason, it is desirable that the battery lock lever 112 is disposed inside the battery chamber 110.

As shown in FIG. 8B, part of the battery chamber 110 is formed as a cutout shape portion 33 of the front cover 30 in an imaginary projection area of the recording medium slot 92 in the Z direction. This cutout shape portion 33 is also used as space when an operation for fixing the battery lock lever 112 with the grip member-fastening screw (fastening member) 121 is performed from the Z direction. Further, the cutout shape portion 33 makes it possible to reduce the size of the battery chamber 110.

Part of the rear side of the battery chamber 110 is defined by the sheet metal member 116 and the sheet metal member 116 is arranged such that it covers the cutout shape portion 33. If all the surrounding walls of the battery chamber 110 are formed by resin without forming part thereof as the cutout shape portion 33 of the front cover 30, the thickness of the part is increased by a thickness t (see FIG. 9B) of the resin.

On the other hand, the sheet metal member 116 can ensure rigidity even in a case where the sheet metal member 116 is smaller in thickness than the resin, and hence it is possible to make the positions of the battery chamber 110 and the recording medium slot 92 closer to each other in the Z direction while securing the shape for regulating the position of the battery 90. As a result, it is possible to reduce the space surrounding the battery chamber 110.

Further, the sheet metal member 116 as an electrically conductive material is electrically connected to the minus terminal of the battery 90 via the chassis member 140, and provides the reference potential. Therefore, it is possible to properly block electromagnetic waves generated from the recording medium 91 by covering the recording medium slot 92 with the sheet metal member 116.

An end face of the sheet metal member 116 in the Y direction has been bent by hemming, which prevents the battery 90 and the recording medium 91 from being scratched when the battery 90 and the recording medium 91 are inserted and removed As shown in FIG. 9C, it is desirable that at least one of the portions of the chassis member 140, which are fastened to the front cover 30, is located in the vicinity of an end of the chassis 140 (indicated by a mark "c" in FIG. 9C). With this arrangement, for example, when a force is applied which deforms the grip member 120 in a direction indicated by an arrow 150 in FIG. 9C (force applied when a user strongly grasps the grip member 120), the chassis member 140 and the front cover 30 are integrally deformed. As a result, it is possible to improve the rigidity feeling felt by a user when the user strongly grasps the grip member 120.

As described above, in the embodiment of the present invention, it is possible to reduce the space surrounding the battery chamber and stably supply electric power.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-122198 filed Jun. 27, 2018, which is hereby incorporated by reference herein in its entirety.

What is claimed is:

1. An electronic camera comprising:
  a battery chamber configured to receive a battery for supplying electric power, the battery chamber being defined by an exterior cover forming part of the appearance of the electronic camera, the exterior cover being provided with a battery holding member that, in a state where the battery is in the battery chamber, maintains a position of the battery in a direction of insertion thereof and is disposed on an inner wall of the battery chamber;
  a battery chamber cover member that covers an outer wall of the battery chamber from an outer wall side of the battery chamber;
  a battery contact member disposed on a bottom surface and that is brought into contact with a terminal provided on the battery to supply electric power from the battery to the electronic camera;
  a fastening member that fastens the battery chamber cover member to the outer wall of the battery chamber from an inner wall side of the battery chamber and that fastens the battery holding member to the inner wall of the battery chamber from the inner wall side of the battery chamber; and
  rails configured to, in a state where the battery is in the battery chamber, maintain the position of the battery along a surface perpendicular to the direction of insertion,
  wherein the battery holding member extends in the direction of insertion and is a plate shaped member that is flexible in a direction perpendicular to the direction of insertion, wherein the rails extend in the direction of insertion and are disposed at corner portions of both sides in the inner wall of the battery chamber to which the fastening member is fastened, and wherein the battery chamber cover member is a grip member.

2. The electronic camera according to claim 1, wherein a portion of the battery chamber opposed to the inner wall to which the fastening member is fastened is open on a line extending in a direction of fastening the fastening member.

3. The electronic camera according to claim 1, wherein the battery chamber cover member is made of a molded electrically conductive material, and the exterior cover is made of a molded electrically non-conductive material.

4. The electronic camera according to claim 3, further comprising:

a chassis member made of the molded electrically conductive material; and heat dissipation shaped portions disposed between the battery chamber cover member and the battery chamber, wherein the chassis member and the battery chamber cover member partially overlap each other in imaginary projections thereof from a front side of the electronic camera, and wherein the chassis member is fixed to the exterior cover at an end of the chassis member.

\* \* \* \* \*